(12) United States Patent
Puigardeu Aramendia et al.

(10) Patent No.: US 11,084,219 B2
(45) Date of Patent: Aug. 10, 2021

(54) GENERATING A THREE-DIMENSIONAL OBJECT

(71) Applicant: Hewlett-Packard Development Company, L.P., Houston, TX (US)

(72) Inventors: Sergio Puigardeu Aramendia, Barcelona (ES); David Ramirez Muela, Barcelona (ES); Pol Fornos, Barcelona (ES); Salvador Sanchez Ribes, Sabadell (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 561 days.

(21) Appl. No.: 15/515,326

(22) PCT Filed: Oct. 3, 2014

(86) PCT No.: PCT/EP2014/071242
§ 371 (c)(1),
(2) Date: Mar. 29, 2017

(87) PCT Pub. No.: WO2016/050321
PCT Pub. Date: Apr. 7, 2016

(65) Prior Publication Data
US 2017/0225401 A1 Aug. 10, 2017

(51) Int. Cl.
*B29C 64/386* (2017.01)
*B33Y 30/00* (2015.01)
(Continued)

(52) U.S. Cl.
CPC .......... *B29C 64/386* (2017.08); *B29C 64/112* (2017.08); *B29C 64/165* (2017.08); *B29C 64/245* (2017.08); *B33Y 10/00* (2014.12); *B33Y 30/00* (2014.12); *B33Y 40/00* (2014.12); *B33Y 50/02* (2014.12); *B29K 2105/251* (2013.01)

(58) Field of Classification Search
CPC ......... B33Y 10/00; B33Y 30/00; B33Y 50/00; B33Y 70/00; B33Y 90/00; B29C 64/10; B29C 64/20; B29C 64/30; B29C 64/40
See application file for complete search history.

(56) References Cited

U.S. PATENT DOCUMENTS 6,483,596 B1 * 11/2002 Philippi ............. G05B 19/4015
156/272.8
8,666,142 B2 3/2014 Shkolnik et al.
(Continued)

FOREIGN PATENT DOCUMENTS

CN 102439603 5/2012
CN 103552243 2/2014
(Continued)

OTHER PUBLICATIONS

International Search Report and Written Opinion for International Application No. PCT/EP2014/071242 dated Jun. 16, 2015, 9 pages.
(Continued)

*Primary Examiner* — Abbas Rashid
*Assistant Examiner* — S. Behrooz Ghorishi
(74) *Attorney, Agent, or Firm* — HP Inc. Patent Department (57) ABSTRACT

Apparatus (100) for generating a three-dimensional object comprising a support (101) to receive build material, and a calibration platform (103) to receive a print media for use with a calibration operation performed by the apparatus. The calibration platform (103) may be moveable between a non-calibration position when the apparatus is operating in a building mode of operation, and a calibration position when the apparatus is operating in a calibration mode of operation.

8 Claims, 6 Drawing Sheets

(51) Int. Cl.
*B33Y 40/00* (2020.01)
*B29C 64/112* (2017.01)
*B29C 64/165* (2017.01)
*B29C 64/245* (2017.01)
*B33Y 10/00* (2015.01)
*B33Y 50/02* (2015.01)
*B29K 105/00* (2006.01)

(56) References Cited

U.S. PATENT DOCUMENTS

| 2006/0111807 A1 | 5/2006 | Gothait et al. |
| 2007/0238056 A1* | 10/2007 | Baumann ............. B29C 64/165 430/325 |
| 2013/0242317 A1 | 9/2013 | Leavitt et al. |

FOREIGN PATENT DOCUMENTS

| CN | 103600493 | 2/2014 |
| CN | 203650991 | 6/2014 |
| EP | 1475220 | 11/2004 |

OTHER PUBLICATIONS

Stopp, S. et al., "A new method for printer calibration and contour accuracy manufacturing with 3D-print technology", Rapid Prototyping Jrnl. vol. 14 Issue 3, 1995, 2 pgs.

* cited by examiner

GENERATING A THREE-DIMENSIONAL OBJECT

Additive manufacturing systems that generate three-dimensional objects on a layer-by-layer basis have been proposed as a potentially convenient way to produce three-dimensional objects.

BRIEF DESCRIPTION OF THE DRAWINGS

For a better understanding of the examples described herein, and to show more clearly how the examples may be carried into effect, reference will now be made, by way of non-limiting example only, to the following drawings in which.

DETAILED DESCRIPTION

A process of generating a tangible three-dimension object may comprise a series of steps which include forming a layer of build material, selectively delivering an agent (for example a coalescing agent and a coalescence modifier agent) to at least one portion of a surface of the layer of build material, and temporarily applying a predetermined level of energy to the layer of build material. The temporary application of energy may cause portions of the build material on which coalescing agent has been delivered or has penetrated to heat up above the melting point of the build material and to coalesce. Upon cooling, the portions which have coalesced become solid and form part of the three-dimensional object being generated. These steps may then be repeated to form a three-dimensional object. Other steps and procedures may also be used with this series of steps.

In the examples described herein a coalescing agent and coalescence modifier agent can comprise fluids that may be delivered using any appropriate fluid delivery mechanism, also referred to as an agent distributor. In one example the agents are delivered in droplet form.

A coalescence modifier agent may be used for a variety of purposes. In one example, a coalescence modifier agent may be delivered adjacent to where coalescing agent is delivered, for example to help reduce the effects of lateral coalescence bleed. This may be used, for example, to improve the definition or accuracy of object edges or surfaces, and/or to reduce surface roughness. In another example, coalescence modifier agent may be delivered interspersed with coalescing agent, which may be used to enable object properties to be modified.

In the examples described herein references to a build material may include, for example, a build material that is a powder-based build material. As used herein, the term powder-based material is intended to encompass both dry and wet powder-based materials, particulate materials, and granular materials.

An apparatus for generating a three-dimensional object may perform calibration steps during operation, for example calibration of agent distributor(s) alignment (for example printhead alignment) with respect to build material being printed on, or calibration of one printhead to another printhead, or color calibration or drop weight/size calibration, or other forms of calibration.

Figure 1:
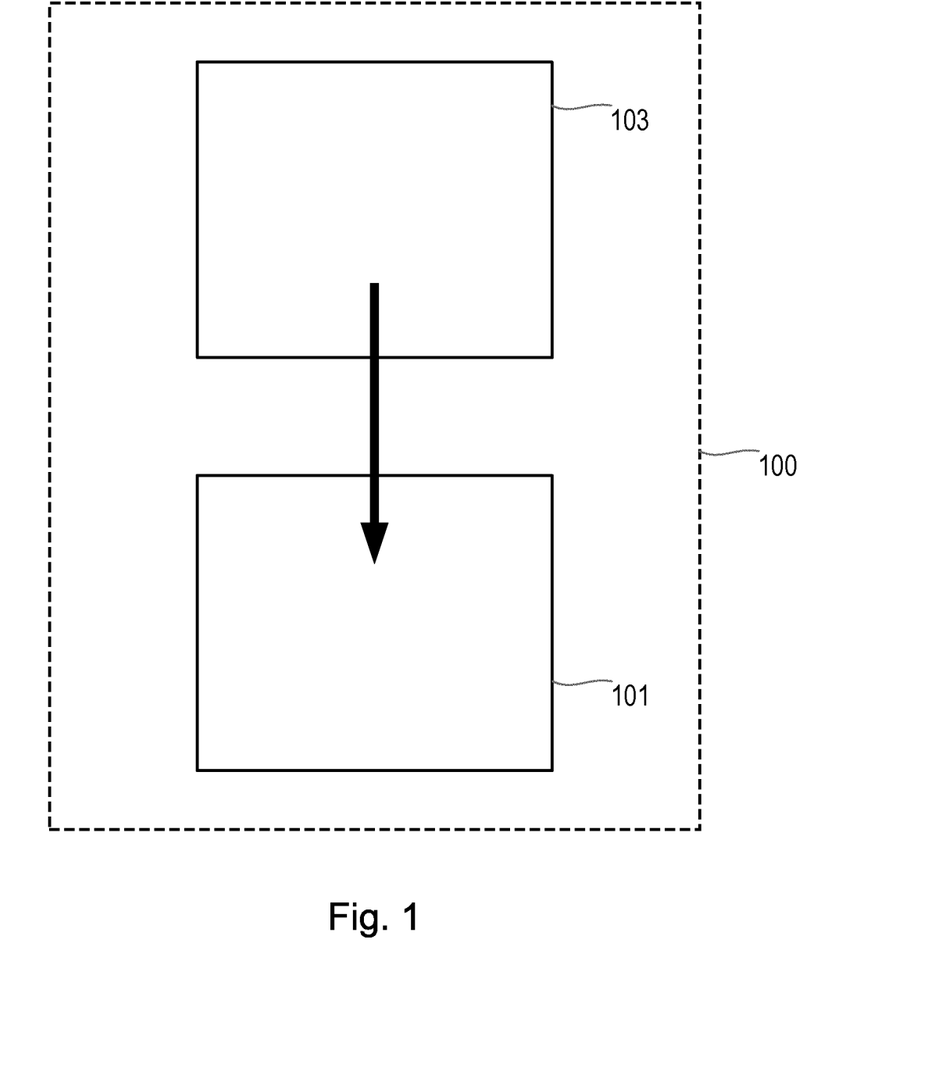
FIG. 1 shows an example of an apparatus for generating a three-dimensional object.

FIG. 1 shows an example of an apparatus 100 for generating a three-dimensional object. The apparatus 100 comprises a support 101 to receive build material. The apparatus 100 comprises a calibration platform 103 to receive a print media for use with a calibration operation performed by the apparatus.

In an example where the build material used in the apparatus for generating a three-dimensional object comprises powder-based build material, the calibration platform 103 has the advantage of enabling a calibration operation to be carried out using a print media, for example paper or vinyl or other form of solid print media, thereby avoiding the need for a calibration operation to be performed using a non-solid print media such as a powder-based build material.

In one example the calibration platform 103 is moveable between a non-calibration position when the apparatus is operating in a building mode (or printing mode) of operation, and a calibration position when the apparatus is operating in a calibration mode of operation.

In one example the support 101 comprises a bed or other surface for receiving build material (for example a powder bed when a build material comprises a powder). Thus, a calibration platform 103 may be installed over a support 101, such as a bed, during a calibration mode of operation. In such an example a calibration platform 103 can therefore be moved into position for calibration, and then moved away before a printing or building operation.

It is noted that the apparatus 100 may comprise other components which are not shown, for example a build material distributor to distribute build material on the support 101, an agent distributor to distribute an agent onto a surface of the build material (or print media when using a calibration platform), an energy source for heating a layer of build material, a controller for controlling the operation of the apparatus, or other components.

In an example where the calibration operation is related to the alignment of an agent distributor that distributes an agent on a surface of a build material, for example a printhead(s) for distributing a coalescing agent and a coalescent modifier agent, the calibration platform 103 may be moveable to a calibration position, for example in a calibration position located under an agent distributor during the calibration mode of operation, such as under a printhead assembly. In such an example the calibration platform 103 may be moved, during a calibration mode of operation, to a position located over the support 101 which receives the build material.

In one example, instead of the calibration platform 103 being moveable, the calibration platform is positioned in a particular location (for example alongside or next to a printing area or print zone, such as alongside or around at least a portion of the printing area), such that an agent distributor (for example a printhead or printheads) can then move to this calibration area when a calibration operation is to be performed. The calibration area may form part of the same support 101 as that used for building, for example alongside an area which receives build material, whereby the calibration area receives a solid print media such as paper or vinyl. In another example the calibration platform 103 is a separate structure to the support 101.

In an example an agent distributor and a calibration platform can therefore be moveable with respect to each other, with the calibration platform 103 and/or the agent distributor being moveable to a calibration position or area when a calibration mode is being performed.

Figure 2:
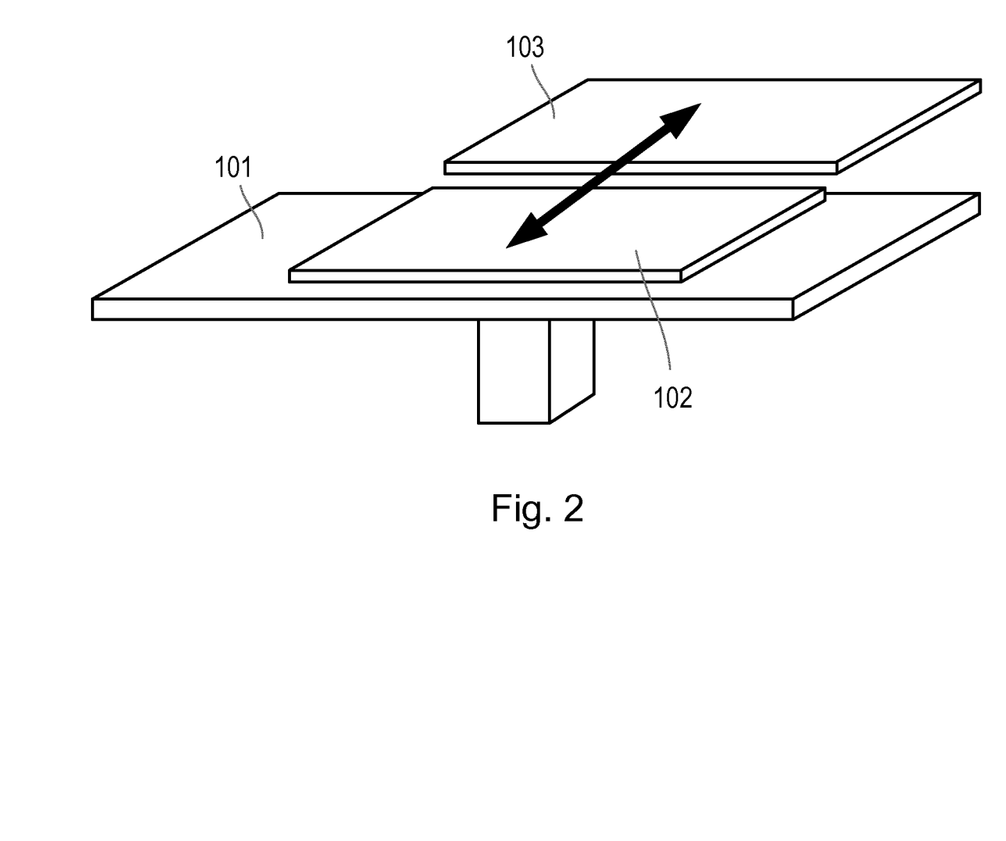
FIG. 2 shows another example of an apparatus for generating a three-dimensional object.

FIG. 2 shows another example of an apparatus for generating a three-dimensional object, illustrating a support 101 and calibration platform 103 (and an example of build media 102 for illustrative purposes).

Figure 3:
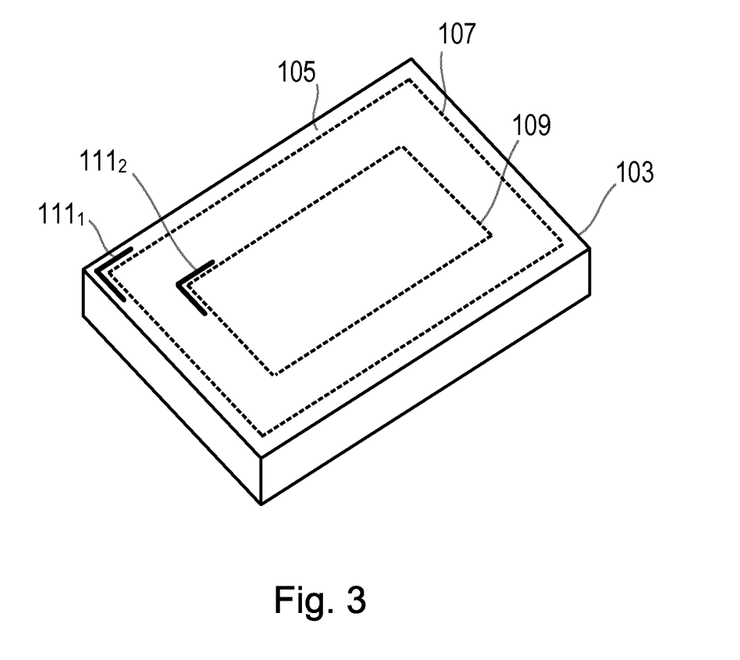
FIG. 3 shows an example of a calibration platform.

Referring to FIG. 3, this shows an example of a calibration platform 103. The calibration platform 103 comprises a surface 105 to receive, during use, a print media (FIG. 3 illustrating dotted lines to represent print media of two different sizes that may be accommodated, although it is noted that any number of sizes may be accommodated). In one example a print media comprises a non-powder print media, for example paper, or vinyl, or some other form of solid substrate.

In one example the surface 105 of the calibration platform 103 is substantially the same size as the support 101 that receives build material. It is noted, however, that the size of the surface of the calibration platform 103, or of the calibration platform 103 itself, may be different to the size of the support 101. In one example the surface of the calibration platform receives, during use, a print media 107 having a size that is substantially the same size as the support 101.

In another example, the surface 105 of the calibration platform 103 receives, during use, a print media 109 having a size that is different to the size of the support 101.

In one example a surface 105 of the calibration platform 103 comprises at least one reference mark (for example at least one reference mark $111_1$ or $111_2$ as shown in FIG. 3) to assist with the positioning of the print media on the surface 105, i.e. with respective print media 107 or 109, such that a print media sheet is placed in a particular position on the calibrating platform 103.

The at least one reference mark may be a pre-printed mark or set of marks, or a reference structure for receiving a removable print media sheet.

Thus, the surface 105 of the calibrating platform 103 may comprise a plurality of reference marks, wherein each reference mark relates to at least one of: a predetermined print media size; a position where a corresponding print media is to be positioned; or a position where a particular print media is to be positioned for a particular calibration operation.

It is noted that the position of the print media and the print media size can be different depending of the type of calibration operation that is to be performed.

A fixing mechanism (not shown) may be provided to fix the print media to the calibration platform 103, for example to temporarily fix the print media during a calibration operation. In one example the fixing mechanism comprises an adhesive portion or belt, or a magnetic support. For example, the fixing mechanism may comprise a vacuum belt or surface, whereby the calibration platform comprises a plurality of holes, through which air is drawn to hold a print media onto the surface 105 of the calibration platform 103 by suction.

An adhesive portion or belt may comprise a portion of a surface of the calibrating platform, or a portion of a print media itself, comprising a "soft" adhesive, whereby the soft adhesive is strong enough to hold the print media against a surface of the calibration platform during a calibration operation, but soft enough to enable the print media to be easily removed. For example, an adhesive having a composition similar to that of a peelable memo pad.

In one example a print media may be formed from a material which holds the print media against a surface of the calibrating platform, for example using electrostatic forces. In such an example the print media effectively clings to the surface of the calibrating platform.

In an example of a magnetic support, at least a portion of a surface of a calibrating platform 103 may comprise a ferric material, with magnetic strips placed around the calibrating platform to hold a print media in position. In an example where a magnetic print material is used, then the magnetic strips can be dispensed with. In another example at least a portion of a surface of the calibrating platform 103 may be magnetic, with ferric strips used around at least a portion of the calibrating platform to hold a print media in place. As above, the use of a print media having ferric particles can avoid the need for ferric strips. Other systems for holding a print media in place, or other types of print media may also be used.

According to one example, the support 101 and the calibration platform 103 are arranged such that the distance between an agent distributor and the print media (i.e. agent distributor-to-print media distance) when operating in the calibration mode is the same as the distance between the agent distributor and build material (i.e. agent distributor-to-build material distance) when operating in a building mode. This has an advantage, in an example, of ensuring that the calibration mode represents the final printing or building operation as closely as possible, i.e. that drops fall in the same position that they are intended to.

Figure 4A:
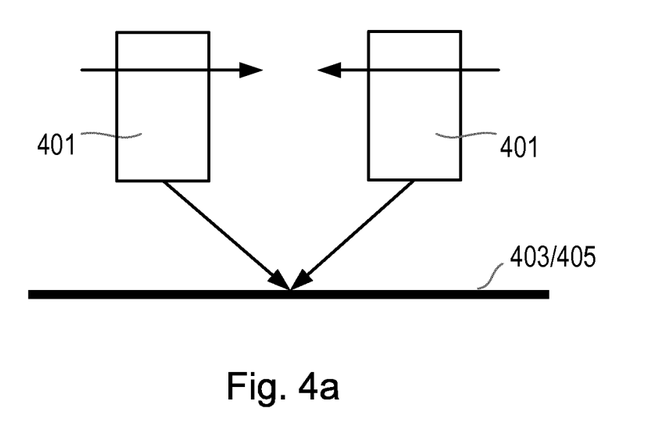
FIGS. 4a and 4b show examples of build material being fired during a printing operation.
Figure 4B:
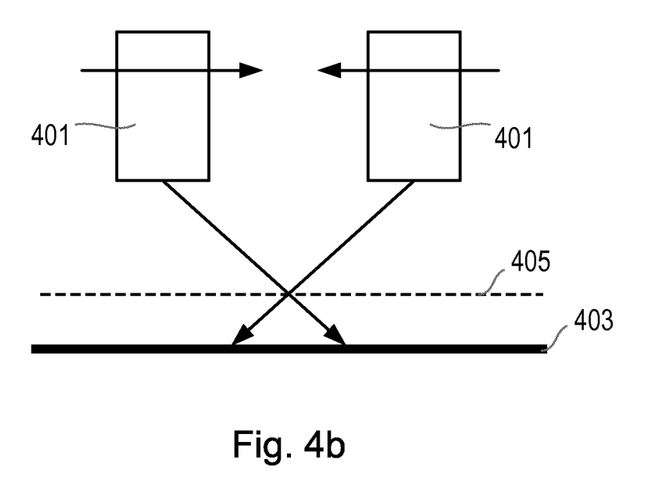

This can be illustrated by FIGS. 4a and 4b, which provide an example of bidirectional printing. From FIG. 4a it can be seen that when build material or an agent, for example drops, are fired from an agent distributor 401 (e.g. printhead) in different directions at a printing height 403 which is the same as a calibration height 405, then drops fired in opposite directions fall aligned. From FIG. 4b, however, it can be seen that if the calibration height 405 is different to the printing height 403, then drops fired in opposite directions fall misaligned. It is noted that in one example the distance between the agent distributor to build material is known, or derived, in order to set the calibration height at the correct value. The surface of the calibration platform can therefore be placed coincident with the surface of the build material during a calibration platform. In an example where the calibration platform is placed directly above the build material during a calibration operation, the agent distributor may be raised by a corresponding amount, for example to ensure that the same distance is maintained during a calibration operation.

It is noted that an agent distributor, as described herein, may comprise a printhead or printheads, such as thermal printheads or piezoelectric printheads. In one example printheads such as suitable printheads used in commercially available inkjet printers may be used. In this case the support 101 and the calibration platform 103 are arranged such that a printhead-to-print media distance when operating in the calibration mode is the same as the printhead-to-build material distance when operating in a building mode.

Accurate positioning of the calibration platform 103 in relation to a print zone can provide accurate datum points, and potentially a safe lock down mechanism, that can help ensure that the surface of the calibration platform 103 remains at a known distance from a build support 101, or print zone bed.

In one example the agent distributors or printheads have a length that enables them to span the whole width of a support member in a so-called page-wide array configuration. In one example this may be achieved through a suitable arrangement of multiple agent distributors or printheads. In other examples a single agent distributor or printhead having an array of nozzles having a length to enable them to span the width of the support member may be used. In other examples, the agent distributor or printhead may have a shorter length that does not enable them to span the whole width of the support member. In such examples, the agent distributor(s) or printhead(s) may be mounted on a moveable carriage to enable them to move bi-directionally across the length of the support member along a page width axis. This enables selective delivery of an agent, for example a coalescing agent and a coalescence modifier agent, across the whole width of the support 101 or calibration platform 103 in a single pass. In other examples the agent distributor(s) may be fixed, and the support member may move relative to the agent distributor(s).

Figure 5:
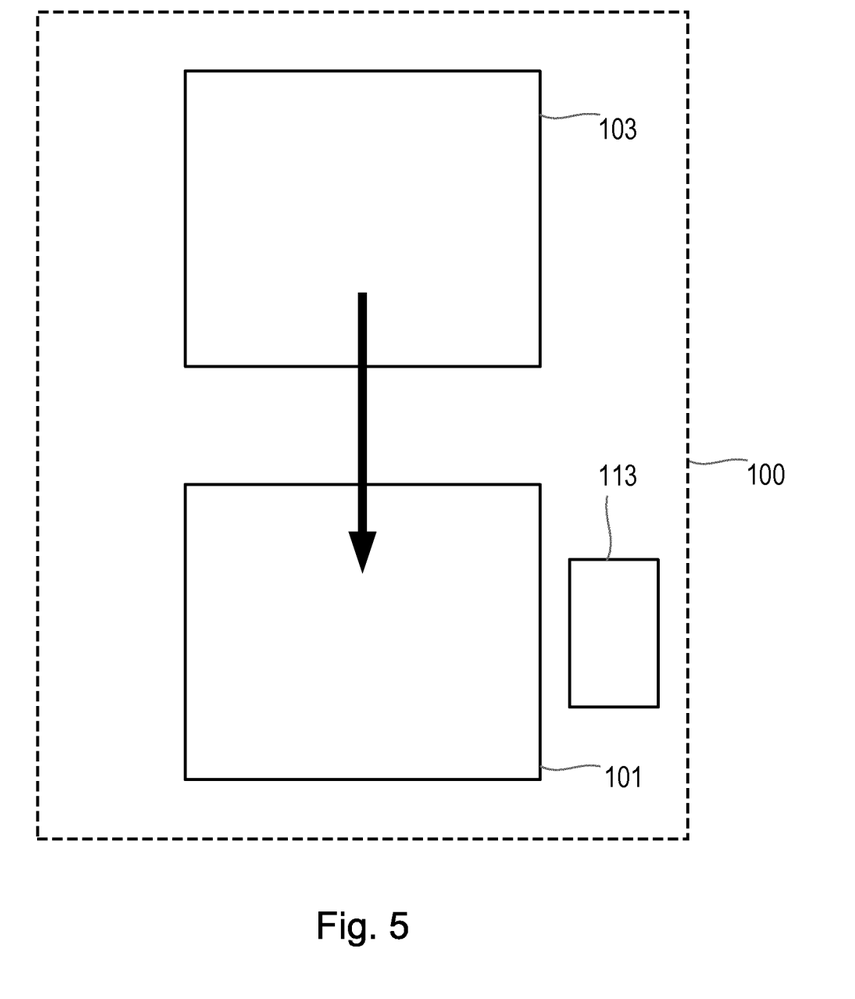
FIG. 5 shows another example of an apparatus for generating a three-dimensional object.

Referring to FIG. 5, in one example the apparatus 100 comprises a controller 113 that enables the apparatus 100 to replicate some of the existing calibration techniques from 2D printer devices. Such calibration techniques may include, for example, printhead alignment, nozzle health checks, color or drop weight/size calibration.

The calibration platform 103 may be used to perform calibration operations that include, but are not limited to:
  alignment of agent distributor(s), e.g. printhead alignment, to compensate printhead position and/or bidirectional compensations in an apparatus which prints in both directions from a pen to paper/powder distance.
  drop weight (or size) calibration: aging or manufacturing differences can modify the drop weight (or size), changing the final appearance of an image, or in this case of mechanical properties.
  nozzle health: verify the status of the nozzles in the printer system, which may be useful to identify a defective printhead, and to replace it if needed, or send a recovery action.

During use, in one example a print media (or media sheet) is placed over the calibration platform 103. As mentioned above the print media may have the same size as the surface 105 of the calibration platform 103, or the same size as the surface 101, or be a standard print media size. In order to attach the print media to the surface 105, some form of fixing means may be provided, for example an adhesive belt or magnetic support(s) as described earlier.

In an example described herein, there is provided the possibility to print something that can be evaluated externally. For example, the external evaluation may comprise a visual evaluation, for example whereby values are read and introduced in a form, or input electronically. An example may also enable something to be printed for automatic evaluation, for example involving scanning or optical sensing and post-processing the data to obtain the calibration results. In either of these methods, images and processing techniques may be used, including for example from other printing technologies.

From the examples described above it can be seen that a removable platform, or calibration platform, can be provided over the surface of the build material, for example over a powder surface, in order to be able to print on a non-powder based media during a calibration mode, for example a paper based media. This has an advantage, in one example, that any currently available calibration techniques that have already been developed for other types of printer systems can be used in an apparatus for generating a three-dimensional object.

In other words, examples described herein have an advantage in that calibration techniques already developed for use with calibrating print systems over a paper/vinyl media support can be used to calibrate three-dimensional print systems that use a non-solid build material, such as powder.

The examples may be used in the calibration of parameters in which agent to build material interaction does not have a material effect in the calibration process, for example such as printhead position or drop weight/size variability. The examples may therefore enable calibration operations to be performed without the complexity of having powder as a printing surface.

The examples also have an advantage in that the calibration operations are not run or analyzed while the printer apparatus is using powder as the printing surface, and as such the high temperatures that may be associated with the thermal printing of the powder surface do not have an adverse affect on any sensors used in the calibration process (for example if they were working outside their normal temperature margins in the powder printing process).

Also, even if an apparatus for generating a three-dimensional object was controlled to operate at low temperatures during a calibration mode on a powder surface, since the sensors used in this low temperature calibration mode would not be removed to print during a normal printing mode, then such sensors may be damaged when operating in the printing mode, for example plastic sensor enclosures being fused, or the sensor components being damaged, which would require new sensors, or improved enclosures to ensure that any sensor is working within predetermined margins.

In an example where a calibration process requires visual evaluation, for example a close visual evaluation of alignment by a user or operator, an example described herein may avoid the need to carry out such an evaluation during a normal printing process on a powder, during which the printing surface may not be particularly accessible and may be very hot.

The examples described herein can therefore help reduce the complexity of making a powder bed surface accessible to evaluate visually the result of some calibration operation.

Figure 6:
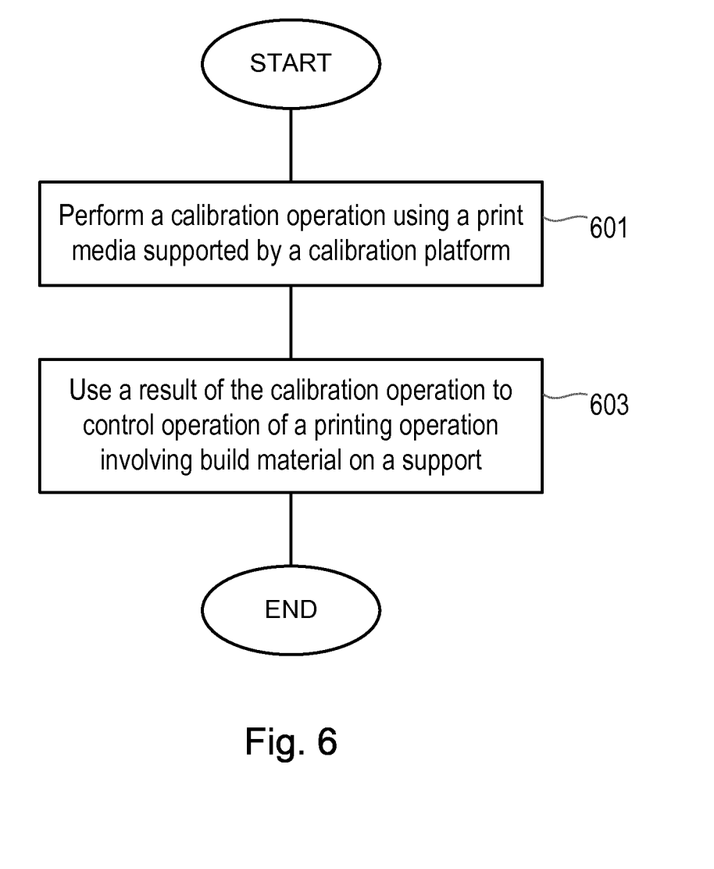
FIG. 6 shows an example of a method of generating a three-dimensional object.

FIG. 6 shows a method according to another example for generating a three-dimensional object. The method comprises performing a calibration operation using a print media supported by a calibration platform, step 601, and using a result of the calibration operation to control operation of a building operation involving build material on a support, step 603.

In one example the method comprises moving the calibration platform 103 between a non-calibration position when the apparatus is operating in a building mode of operation, and a calibration position when the apparatus is operating in a calibration mode of operation.

The method may comprise moving the calibration platform 103, during the calibration mode of operation, to a calibration position located under an agent distributor, or above the surface which receives the build material.

A calibration operation may involve at least one parameter in which an interaction between an agent and a build material does not have a material effect on the calibration process.

In one example the method comprises using a print media having a size that is substantially the same size as the support 101, or using a print media having a size that is different to the size of the support 101.

In an example the time to calibrate the printer can also be reduced, since there is no requirement to build a physical part in order to calibrate a particular parameter. For example, building a part having a height of 1 cm could take about 100 times longer than building a pattern over a print media.

According to one example, there is provided a calibration platform 103 for use in an apparatus 100 for generating a three-dimensional object. In one example the calibration platform 103 is separate from a support 101 which receives build material for generating the three-dimensional object, but mechanically coupled thereto.

It is noted that although an example describes a calibration platform 103 receiving a removable print media for use with a calibration operation performed by the apparatus, the calibration platform and print media can form part of the same entity, such that the calibration platform itself forms the print media which is to be used in the calibration operation. In such an example a surface of a calibration platform may be reprinted during each calibration operation, or the calibration platform itself replaced after a calibration operation or a predetermined number of calibration operations.

In one example, there is provided one or more computer-readable storage media comprising instructions stored thereon, that when executed, direct a processor to perform a method comprising: performing a calibration operation using a print media supported by a calibration platform; and using a result of the calibration operation to control operation of a building operation involving build material on a support. In one example the calibration platform is separate from the support. In one example the calibration platform and support are moveable with respect to each other.

It should be noted that the above-mentioned description illustrates rather than limits the examples described herein, and that those skilled in the art will be able to design many alternative examples without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. An apparatus for generating a three-dimensional object, the apparatus comprising:
    a support to receive build material;
    a calibration platform distinct from the build material support to removably receive a sheet of paper, the calibration platform positioned alongside the build material support for a calibration mode of operation; and
    a printhead movable over the build material support to distribute a fluid coalescing agent on to build material on the build material support during a building mode of operation and moveable over the calibration platform to distribute the coalescing agent on to a sheet of paper on the calibration platform during a calibration mode of operation.

2. The apparatus as claimed in claim 1, comprising a sheet of paper on the calibration platform.

3. The apparatus as claimed in claim 1, wherein the calibration platform is moveable between a calibration position alongside the build material support for the calibration mode of operation and a non-calibration position away from the build material support for the building mode of operation.

4. The apparatus as claimed in claim 1, wherein the calibration platform comprises a surface to removably receive the sheet of paper.

5. The apparatus as claimed in claim 1, wherein a surface of the calibration platform comprises at least one reference mark to assist with positioning the removable sheet of paper on the surface, or a reference structure for receiving the removable sheet of paper.

6. The apparatus as claimed in claim 5, wherein the surface of the calibrating platform comprises a plurality of reference marks, wherein each reference mark relates to at least one of:
    a predetermined sheet size;
    a position where a corresponding sheet is to be positioned;
    a position where a particular sheet is to be positioned for a particular calibration operation.

7. The apparatus as claimed in claim 1, comprising a fixing mechanism to removably fix the sheet of paper to the calibration platform.

8. The apparatus as claimed in claim 7, wherein the fixing mechanism comprises an adhesive portion or a magnetic system.

* * * * *